US012457217B1

(12) United States Patent
Oster

(10) Patent No.: US 12,457,217 B1
(45) Date of Patent: *Oct. 28, 2025

(54) METHODS AND SYSTEMS FOR AUTHORIZING A CLIENT DEVICE TO A SERVICE

(71) Applicant: PubNub, Inc., San Francisco, CA (US)

(72) Inventor: Jason Oster, San Francisco, CA (US)

(73) Assignee: PubNub, Inc., San Francisco, CA (US)

( * ) Notice: Subject to any disclaimer, the term of this patent is extended or adjusted under 35 U.S.C. 154(b) by 173 days.

This patent is subject to a terminal disclaimer.

(21) Appl. No.: 18/524,464

(22) Filed: Nov. 30, 2023

Related U.S. Application Data

(63) Continuation-in-part of application No. 16/983,531, filed on Aug. 3, 2020, now Pat. No. 11,876,803.

(51) Int. Cl.
| | | |
|---|---|---|
| *H04L 9/40* | (2022.01) | |
| *H04L 9/08* | (2006.01) | |
| *H04L 9/32* | (2006.01) | |

(52) U.S. Cl.
CPC .......... *H04L 63/101* (2013.01); *H04L 9/0825* (2013.01); *H04L 9/3213* (2013.01); *H04L 9/3236* (2013.01)

(58) Field of Classification Search
CPC ... H04L 63/101; H04L 9/0825; H04L 9/3213; H04L 9/3236
See application file for complete search history.

(56) References Cited

U.S. PATENT DOCUMENTS

| | | | | |
|---|---|---|---|---|
| 7,219,234 | B1* | 5/2007 | Ashland | G06F 21/604 |
| | | | | 726/16 |
| 8,521,877 | B2* | 8/2013 | Zhang | H04L 12/2809 |
| | | | | 455/410 |
| 11,051,167 | B2* | 6/2021 | Hancock | H04W 12/02 |
| 11,301,849 | B2* | 4/2022 | McCauley | H04L 63/20 |
| 2007/0123226 | A1* | 5/2007 | Liang | G06F 21/6218 |
| | | | | 455/414.1 |
| 2010/0146595 | A1* | 6/2010 | Sheymov | H04L 63/101 |
| | | | | 726/4 |
| 2013/0305393 | A1* | 11/2013 | Zhang | G06F 21/6218 |
| | | | | 726/29 |
| 2013/0346310 | A1* | 12/2013 | Burger | H04L 63/101 |
| | | | | 705/44 |
| 2014/0109198 | A1* | 4/2014 | Brown | H04L 12/2861 |
| | | | | 726/4 |

(Continued)

*Primary Examiner* — Yonas A Bayou
(74) *Attorney, Agent, or Firm* — Fox Rothschild LLP

(57) ABSTRACT

A method of authorizing a client device to a service includes, by an electronic device: defining an access control list that includes permissions for authorized clients of a customer, creating authorization tokens and encoding the ACL into each of the authorization tokens, and distributing the authorization tokens to the authorized clients. The method includes, by a data center that provides a service to one or more of the authorized clients: receiving a service request to provide the service to a first client in which the request includes a submitted authorization token, decoding the submitted authorization token to identify a received ACL in the submitted authorization token, analyzing the received ACL to determine whether the first client is an authorized client and the permissions in the received ACL grant the first client permission to access the service, and if so, providing the service to the first client.

19 Claims, 6 Drawing Sheets

(56) References Cited

U.S. PATENT DOCUMENTS

| | | | |
|---|---|---|---|
| 2015/0327073 A1* | 11/2015 | Rommer | H04L 63/101 455/410 |
| 2015/0351002 A1 | 12/2015 | Sankar et al. | |
| 2017/0093871 A1* | 3/2017 | Abuelsaad | H04L 63/101 |
| 2018/0367311 A1* | 12/2018 | Stahlberg | H04L 9/3271 |
| 2019/0332451 A1* | 10/2019 | Tamjidi | H04L 63/101 |

* cited by examiner

METHODS AND SYSTEMS FOR AUTHORIZING A CLIENT DEVICE TO A SERVICE

RELATED APPLICATIONS AND CLAIM OF PRIORITY

This document claims priority to, and is a continuation-in-part of, U.S. patent application Ser. No. 16/983,531, filed Aug. 4, 2020, the disclosure of which is fully incorporated into this document by reference.

BACKGROUND

The present disclosure relates to methods and systems for verifying access permissions for services, content and/or the like over networks such as the Internet.

Typically, third party content or service providers maintain a list of access controls associated with each of its users and verifies requests from such users (or others) before granting the requested access. However, verification of access controls can be challenging in even low-scale situations. These systems must consistently handle a significant number of access requests and perform a large number of verifications per second to keep up with the demand of access requests. This approach makes scaling such services difficult.

SUMMARY

As described in more detail below, a system for authorizing a client device to a service includes a first electronic device and a first computer-readable storage medium having one or more programming instructions that, when executed, cause the first electronic device to perform certain actions. The first electronic device may define an access control list that includes a plurality of permissions for a plurality of authorized clients of the customer, create a plurality of authorization tokens, and encode the ACL into each of the authorization tokens, and distribute the authorization tokens to the authorized clients.

The system may further include a second electronic device associated with a data center that provides a service to one or more of the authorized clients, and a second computer-readable storage medium having one or more programming instructions that, when executed, cause the second electronic device to perform certain actions. The second electronic device may receive a service request for the service from a requesting client, or from another entity on behalf of a client, that includes a submitted authorization token, decode the submitted authorization token to identify a received ACL in the submitted authorization token, analyze the received ACL to determine whether the client is an authorized client and the permissions in the received ACL grant the client permission to access the service, and in response to determining that the client is an authorized client and the permissions in the received ACL grant the client permission to access the service, provide the service to the client.

Optionally, the system may encode the ACL into each of the authorization token by applying a cryptographic operation on the ACL to generate an encrypted ACL, and incorporate the encrypted ACL into each of the authorized tokens.

In some implementations, the system may apply the cryptographic operation by applying a hash function to the ACL. In some implementations the system may apply the cryptographic operation by encrypting the ACL using a private key associated with the customer.

Optionally, the system may distribute the authorization tokens to the authorized clients without retaining a copy of the ACL.

In some implementations, the permissions may include one or more of the following: data read access, data write access, or management administrative access.

In some implementations, the second computing device may receive, from the first electronic device, an indication of one or more permissions that have been revoked for the client for whom the request is received. The second electronic device may analyze the received ACL to determine whether the client is an authorized client and the permissions in the received ACL grant the client permission to access the service by determining whether any of the permissions in the received ACL have been revoked, and, if so, denying the client permission to access the service.

DETAILED DESCRIPTION

Figure 1:
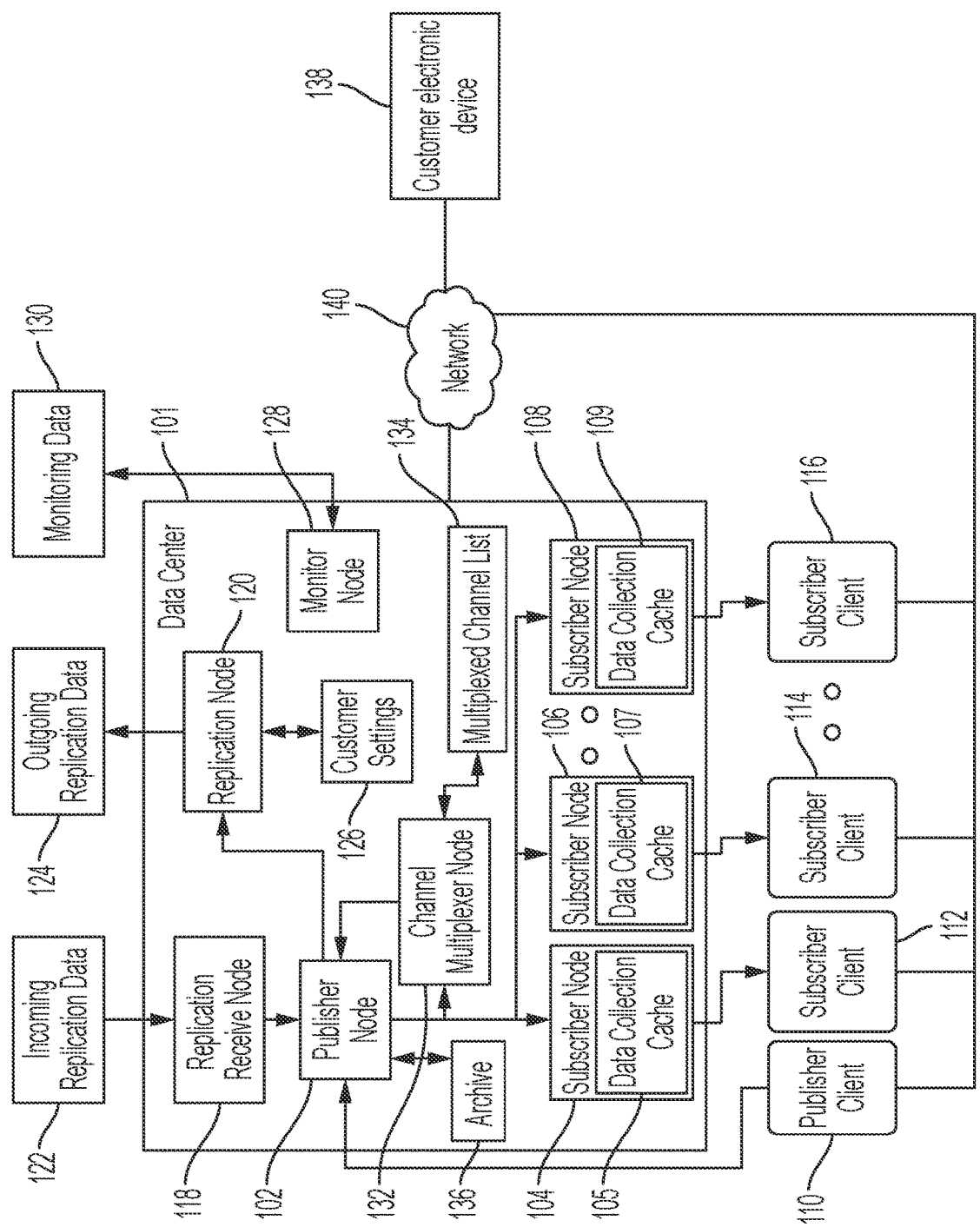
FIG. 1 depicts an example system for authorizing a client device to a service

This disclosure is not limited to the particular systems, methodologies or protocols described, as these may vary. The terminology used in this description is for the purpose of describing the particular versions or embodiments, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

The following terms shall have, for purposes of this application, the respective meanings set forth below:

An "access control list" or "ACL" refers to a file system construct used to control access to data, content, objects, services, and/or the like.

As used in this document, a "cloud computing system" or "cloud application service" refers to one or more physical and/or logical computing devices that operate as a shared resource for multiple other computing devices. An example is a server on which an application is run or data is streamed, connected via an Internet protocol connection among several client computing devices. Examples of client devices include some computers equipped with a browser, smart phones and other networked devices, operating systems, and browsers. The client computers may run a specific application to receive the data, or they may simply open a window or other connection, such as via a browser, through which the client can view operation of the application on the remote server. With a cloud computing system, it may be possible to share services and/or data between within any one of the following layers, (i) client, (ii) application, (iii) platform, (iv) infrastructure and (v) server.

Cloud application services deliver software and/or data as a service over a network such as the Internet. For example, cloud platform services may deliver a computing platform and/or solution stack as a service.

The term "customer" as used in this disclosure means an entity desiring, contracting, and providing consideration for a service. The consideration may be a payment, or agreeing to provide another item of value to the service, such as agreeing to view an advertisement, or agreeing to share certain data with the service. The term "subscriber" as used in this disclosure means an entity that receives published messages. The term "publisher" as used in this disclosure means an entity that originates, publishes or otherwise processes messages that are to be published.

An "electronic device" or a "computing device" refers to a device that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, and mobile electronic devices such as smartphones, personal digital assistants, cameras, tablet computers, laptop computers, media players and the like. In a client-server arrangement, the client device and the server are each electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity.

The term "message" as used herein means one or more discrete bundles of data containing content, instructions, routing information, and/or authentication information. The content (i.e., payload) of a message may be part of the message, routing and authentication information may be included in another part such as a header, and the entire payload and header may be wrapped in an envelope. Messages can optionally be encrypted, e.g. through SSL and AES encryption protocols. Messages can be formatted in a standard data-format (e.g., JSON, XML, HTML, and the like).

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

FIG. 1 depicts an example system for authorizing a client device to a service according to an embodiment. In the embodiments described in this document, a cloud computing service may include or be connected to multiple data centers that are located in a variety of geographic regions. Each data center 101 may include various "nodes," which in this document refers to a process residing on one or more computing device containing a processor and/or computer-readable memory, along with programming instructions and/or data. The number of nodes that can reside on a particular device may depend on the number of processors, amount of memory, and/or the amount of data storage available on the computing device. The nodes in this embodiment include a publisher node 102 and one or more subscriber nodes 104, 106, 108, a replication receive node 118, a replication broadcast node 120, a channel multiplexer node 132, and a monitor node 128.

Connected to the data center are any number of publisher clients 110 and any number of subscriber clients 112, 114, 116. The term "publisher" client refers to a client that directly or indirectly sends messages to the cloud computing service. The term "subscriber" client refers to a client that is receiving messages from the data center. Optionally, some clients may be both publishers and subscribers based on the action that they are performing at any given time. Each client will include a processor, user interface, computer-readable memory, and a communications connection to a network so that messages may be transmitted between the data center and the client. As indicated in FIG. 1, any number of subscriber nodes and clients may exist for a particular data center. Additionally, the number of publisher nodes and clients may vary. The embodiments are not limited in this regard. For example, multiple publisher nodes may operate in parallel to publish messages. In such situations, a load balancer (not shown in FIG. 1) may be used to distribute messages across all the publisher nodes. This also shows that the data center may be a multi-tenant data center that stores and distributes messages from a variety of publishers.

Data center 101 also includes replication broadcast node 120, which stores and transmits outgoing replication data 124, and replication receive node 118, which receives and stores incoming replication data 122. In embodiments, data center 101 also includes a monitor node 128 which sends and receives monitoring data 130. Note that it is not necessary that each node include a processor and/or computer-readable memory for that of other nodes in the data center. Indeed, a single node may serve multiple functions depending on the program instructions that it runs at any given time. For example, a single server may contain programming instructions that allow the server to operate as a subscriber node, a publishing node, a replication broadcast node and/or a replication receive node.

As will be explained in greater detail below, the subscriber clients 112, 114, 116 connected to subscriber nodes 104, 106, 108 may be subscribed to particular channels. A "channel" is a data stream, such as a stream of messages, that is separately identifiable from other channels. A channel may be published and/or subscribed to. In some embodiments, a channel is a virtual concept characterized metadata included in messages. In some embodiments, a channel corresponds to a physical device, such as an I/O port, radio frequency tuner setting, a port associated with an Internet Protocol (IP) address, a specific fiber optic or electronic communication path, a specific sending or receiving device, and/or the like. A channel may be characterized by both virtual and physical attributes. A message is considered published to a channel when the message is assigned metadata that characterizes the massage as being part of that channel. A message may be assigned to more than one channel. A device can subscribe to one or more channels such that messages assigned to the subscribed channels are delivered to the subscribed device. Multiple channels may be subscribed to at the same time. Any number of subscribers may subscribe to a channel that publishes messages. A channel may be characterized by a source or a destination.

A client may connect to a subscriber node using any now or hereafter known protocol. For example, the subscriber node may allow a long-lived connection such as long-polling, COMET, WebSockets, SPDY, BOSH, or other techniques. In some embodiments, any number of subscriber clients may subscribe to a channel that publishes messages concerning a particular television show that the users of subscriber clients 112, 114, 116 are watching. As events occur in the television show, a publisher client 110 may wish to publish a message that will instruct the subscriber clients 112, 114, 116 (e.g., an application running on a smart phone, tablet, and/or computer) to display a poll requesting the users' opinion concerning the event. For example, an instruction to ask "Do you like the singer's performance" may be published for a live music contest.

In another embodiment implementing a voice-over-IP (VOIP) phone network, any number of subscriber clients within the network may subscribe to individual dedicated channels. This embodiment illustrates that subscriber and publisher identities need not be static and can change based on whether the client is sending or receiving a message. When a VoIP software caller dials another user, the caller can be represented as a publisher client 110. The VOIP caller (i.e. the publisher client) will publish a message to a subscriber client 112 (i.e. the VoIP call receiver). The message would trigger the VOIP phone on subscriber client 112 to ring. If the user of the VOIP phone subscriber client 112 answers the phone, the phone would become a new publisher client and publish an answer message to VoIP caller, now a subscriber client. In this embodiment, each user device is connected as a publisher client and as a subscriber client.

To publish a message to one or more subscriber clients 112, 114, 116, the publisher client 110 publishes a message on one or more appropriate channels to reach the clients. In addition, each subscriber client also subscribes to a channel to receive messages. In some embodiments, a channel may be exclusive to a client, such that the particular client is the only subscriber. This channel is used if a publisher client 110 wishes to send a message to only one subscriber client. As can be seen, any combination of subscriber clients may be subscribed to a channel at any particular time. The embodiments are not limited in this regard.

In an example, publisher client 110 may transmit a message to the data center 101, which receives the message through publisher node 102. Publisher node 102 in turn transmits the message to the appropriate channel to reach subscriber nodes 104, 106, 108. Subscriber nodes 104, 106, 108 include data collection caches 105, 107, 109 where messages are temporarily stored for a predetermined duration. In addition, the message is sent to replication node 120. Based on customer settings 126, defined by a customer that may or may not be a subscriber or publisher, the replication node 120 determines whether the published message should be replicated to other data centers (not shown in FIG. 1). For example, if a customer decides that published messages to their subscribers should be replicated to some or all of the data centers, the replication node will broadcast the message as outgoing replication data 124 to the other data centers that are to replicate the broadcast message. Publisher node 102 is also connected to archive 136 to store messages that are indicated for longer term storage and retrieval. The data collection caches 105, 107, 109 are only intended for short term storage and are regularly purged. The archive 136 is used to store messages that are intended to remain available beyond the time provided by the data collection caches 105, 107, 109. One of ordinary skill will recognize that the archive can be located on the data center or on a remote computing device or node. The purging, archive, and retrieval processes are described in greater detail below.

Conversely, if one of the other data centers broadcasts a message that is to be replicated on the first data center 101, the replication receive node 118 will receive the broadcast message as incoming replication data 122. This broadcast message will then be sent to the publisher node 102 and published to the subscriber clients 112, 114, 116 through subscriber nodes 104, 106, 108.

Publisher client 110 and subscriber clients 112, 114, 116 are associated with a customer. For example, a customer may wish to implement the data distribution system described herein. The customer is assigned with a unique domain name or subdomain name that is used by the customer's clients (both publishers and subscribers) to connect to data center 101. As used herein, a domain or subdomain name can be any kind of address, e.g. any computer, network, or internet address that allows the client to identify and establish a connection with one or more remote computing devices. The embodiments are not limited in this regard. As discussed above, whether messages are replicated can be based on customer settings 126. Customer settings 126 may also include one or more dedicated domain or subdomain names. These dedicated domains or subdomains will be used to route the publisher and subscriber clients to the appropriate data centers. In an embodiment, the domain or subdomain name used by the clients is resolved to a one or more data centers using one of many load balancing algorithms e.g. round-robin, least-loaded, and the like. The selection of data centers may be predetermined or pre-configured in customer settings 126. In another embodiment, the domain or subdomain name used by the clients will resolve to the data center nearest to the client device, e.g. using a geographic-DNS service. One of skill in the art will recognize that the customer settings determining how to resolve the unique customer domain name can be changed depending on the desires and/or needs of the customer.

As illustrated in FIG. 1, one or more customer electronic devices 138 may be in communication with one or more data centers 101 and/or one or more clients (e.g., published client 110 and/or one or more subscriber clients 112, 114, 116). A customer electronic device may communicate with a data center 101 and/or a client 110, 112, 114, 116 via one or more communication networks.

Monitor node 128 monitors for monitoring data 130 transmitted from a data center routing node (not shown in FIG. 1). Monitoring data 130 may be a small packet (e.g. a ping packet) that is received by monitor node 128. Monitor node 128 then sends another small packet back to the data center routing node. The purpose of the monitor node is to inform the data center routing node that the data center is active. This information is used to aid the data center routing node to determine the closest active data center for publishers and subscribers connecting to channels that enable multi-region replication and to perform associated fail-over operations described below.

As discussed above, any combination of subscriber clients may be subscribed to a channel at any particular time. Conversely, a subscriber client may subscribe to any combination of channels. In an embodiment, multiple channel messaging is handled by a channel multiplexer node 132 which creates and manages traffic on multiplexed channels. Channel multiplexer node 132 is coupled with a multiplexed channel list 134. Multiplexed channel list 134 may be a database or table that relates each multiplexed channel with the channels that are being multiplexed and allows channel multiplexer node 132 to easily determine whether a particular channel is being multiplexed.

For example, publisher client 110 may publish to channels A, B, and C. Subscriber client 112 may wish to subscribe to channels A and B and, therefore, receive messages published to either channel. Channel multiplexer node 132 will automatically create a new multiplexed channel AB when subscriber client 112 subscribes to both channels. When a message is published by publisher node 102 on channels A, for example, channel multiplexer node 132 checks the multiplexed channel list 134 to determine if channel A is part of a multiplexed channel. Since channel A is being multiplexed into channel AB, any message published on channel A will be republished by channel multiplexer node 132 to channel AB. A similar process will be followed for any messages published on channel B. However, any message published on channel C will not be republished since channel C is not part of any multiplexed channel.

Figure 2:
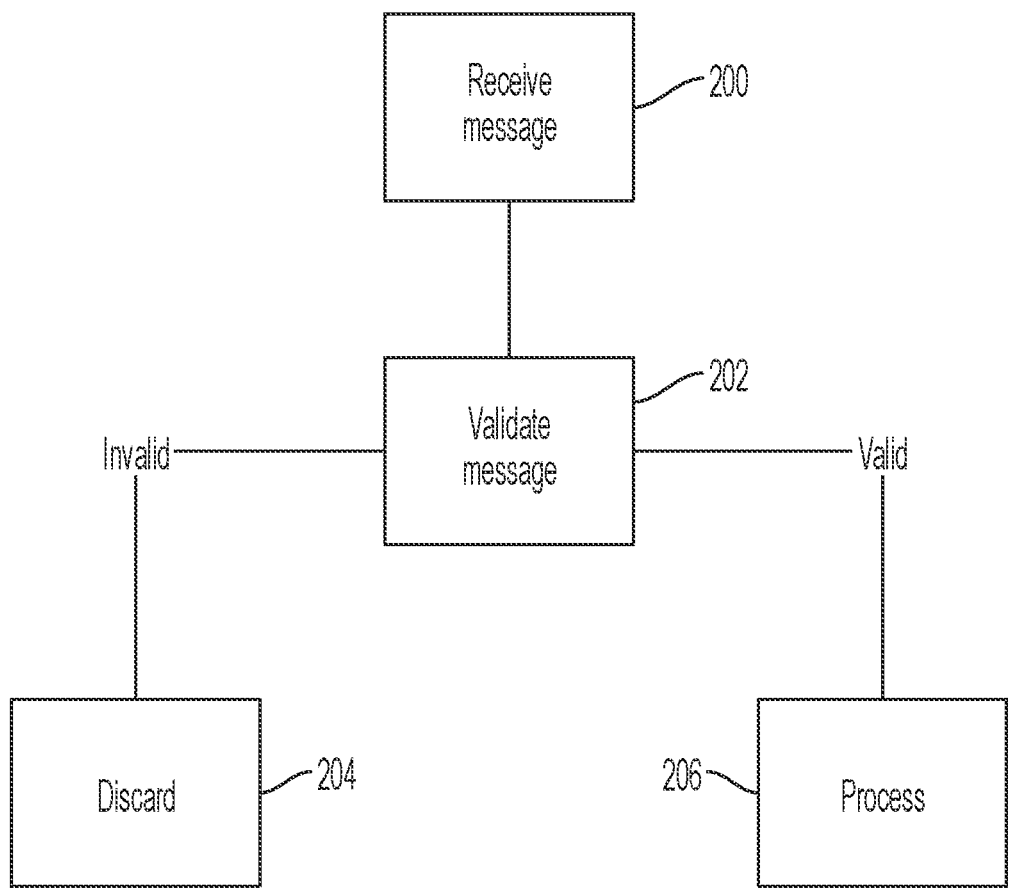
FIG. 2 illustrates a flow chart of an example method of processing one or more messages received from one or more publisher clients.

FIG. 2 illustrates a flow chart of an example method of processing one or more messages received from one or more publisher clients according to an embodiment. As discussed above, a publisher client publishes messages on one or more channels to which subscriber clients have subscribed. A publisher node may receive 200 a message from a publisher client on a channel. In various embodiments, the message may be validated 202. Message validation may include determining whether the publisher client sending the message is an authorized user, for example. If the message is invalid, it may be discarded 204. If the message is valid, it may be further processed 206 or handled by the system.

Figure 3:
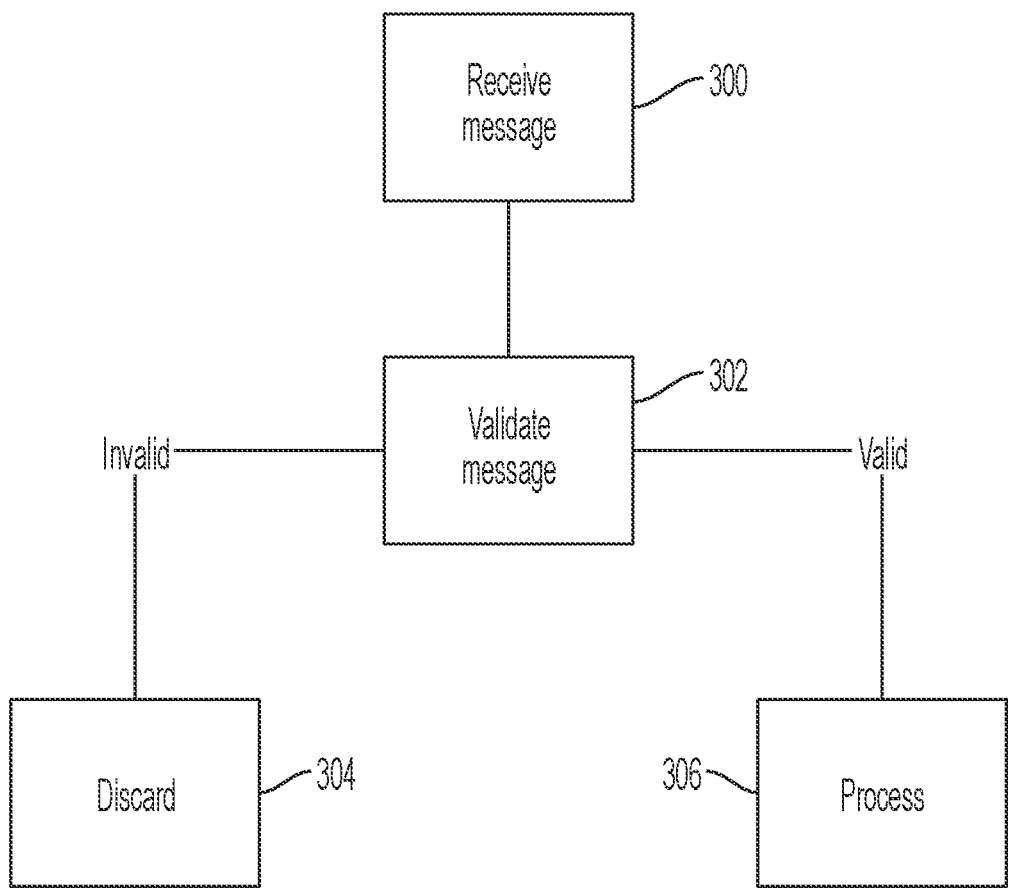
FIG. 3 illustrates a flow chart of an example method of processing one or more messages.

FIG. 3 illustrates a flow chart of an example method of processing one or more messages received a request is received from a subscriber client, or when a subscriber connects to a channel on which one of the data centers broadcasts messages. As illustrated in FIG. 3, a request may be received 300 from a subscriber client. The request may include one or more subscriber credentials and, if the request is a reconnection request, a time token of the last message received by the subscriber client. Examples of subscriber credentials may be subscriber identification keys, encryption keys, or any other form of electronic credential that the system may require. The embodiments are not limited in this regard.

After receiving the request from the subscriber client, the request may be validated 302 to confirm that the subscriber is authorized to use the service (i.e., receive one or more message streams). If not, the request is discarded 304 and/or copied to a storage location for further analysis. If the subscriber is authorized to use the service, it may be further processed 306 or handled by the system.

Figure 4:
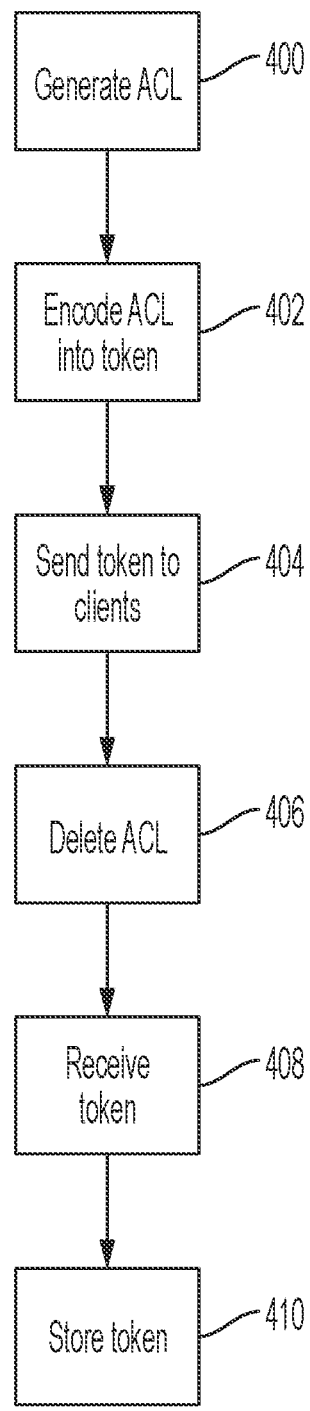
FIG. 4 illustrates an example method of performing validation according to an embodiment.

FIG. 4 illustrates an example method of performing validation according to an embodiment. The validation may be of a message and/or request as described above. As illustrated by FIG. 4, a customer or another component of the system may generate 400 an access control list (ACL) for one or more of its clients. The clients may be subscriber clients, publisher clients, and/or the like.

An ACL may specify which clients may be granted access to objects, as well as what operations may be allowed on given objects or what permissions are granted. Optionally, an ACL also may include regular expression patterns, also known as regex patterns, which are character strings that a system may use to search and find matching patterns. When a data center receives a request for access (e.g., in the form of a request, a message, and/or the like), the data center may analyze data it receives, compare it to the criteria described in the ACL (such as by applying pattern matching to a regex pattern and information received from the requesting client), and either permit or prohibit the access request.

In various embodiments, an electronic device may generate 400 an ACL by identifying one or more clients, and assigning one or more access rights to each of the identified clients. In various embodiments, an ACL may store an identifier that uniquely identifies a client, and one or more access rights and/or permissions assigned to the client. Inclusion of a unique identifier of a client in an ACL may indicate that the client is an authorized client. Example access rights and/or permissions may include, without limitation, data read access, data write access, management administrative access, and/or the like. An electronic device may generate 400 an ACL that is specific to each client. For instance, in response to a request from a customer an electronic device may generate 400 an ACL that defines Client A's access rights, and a different ACL that defines Client B's access rights. Alternatively, an electronic device may generate 400 an ACL that defines access rights across multiple different clients.

The electronic device may encode 402 a generated ACL into an authentication token. A token refers to data generated by a data center that contains information to identify a specific client and the validity of the token. A client may request that an access request be validated by providing a data center with its authentication token. A data center may process the client's request once it validates the authentication token provided by the client.

The electronic device may encode 402 a generated ACL into an authentication token by applying the cryptographic operation on the ACL and including the encrypted ACL into the authentication token. Examples of cryptographic operations may include, without limitation, a hash function.

In various embodiments, an electronic device may perform one or more cryptographic operations on an ACL to generate a hash-based message authentication code (HMAC). For example, hash functions such as SHA256 or SHA3 may be used in the calculation of an HMAC. The HMAC may be included in the authentication token along with the ACL.

In various embodiments, an electronic device may generate a private key and use the private key to encrypt an ACL. The electronic device may include the encrypted ACL into an authentication token.

An electronic device may send 404 an authentication token to one or more clients. For example, an electronic device may send 404 an authentication token to one or more client devices associated with one or more authorized clients. Once one or more tokens having an encoded ACL are distributed, the electronic device may delete 406 the generated ACL(s) from its memory or caches so that the customer electronic device does not retain a copy of the ACL(s). The clients may receive 408 the distributed authentication token, and they may store 410 the token in memory.

Figure 5:
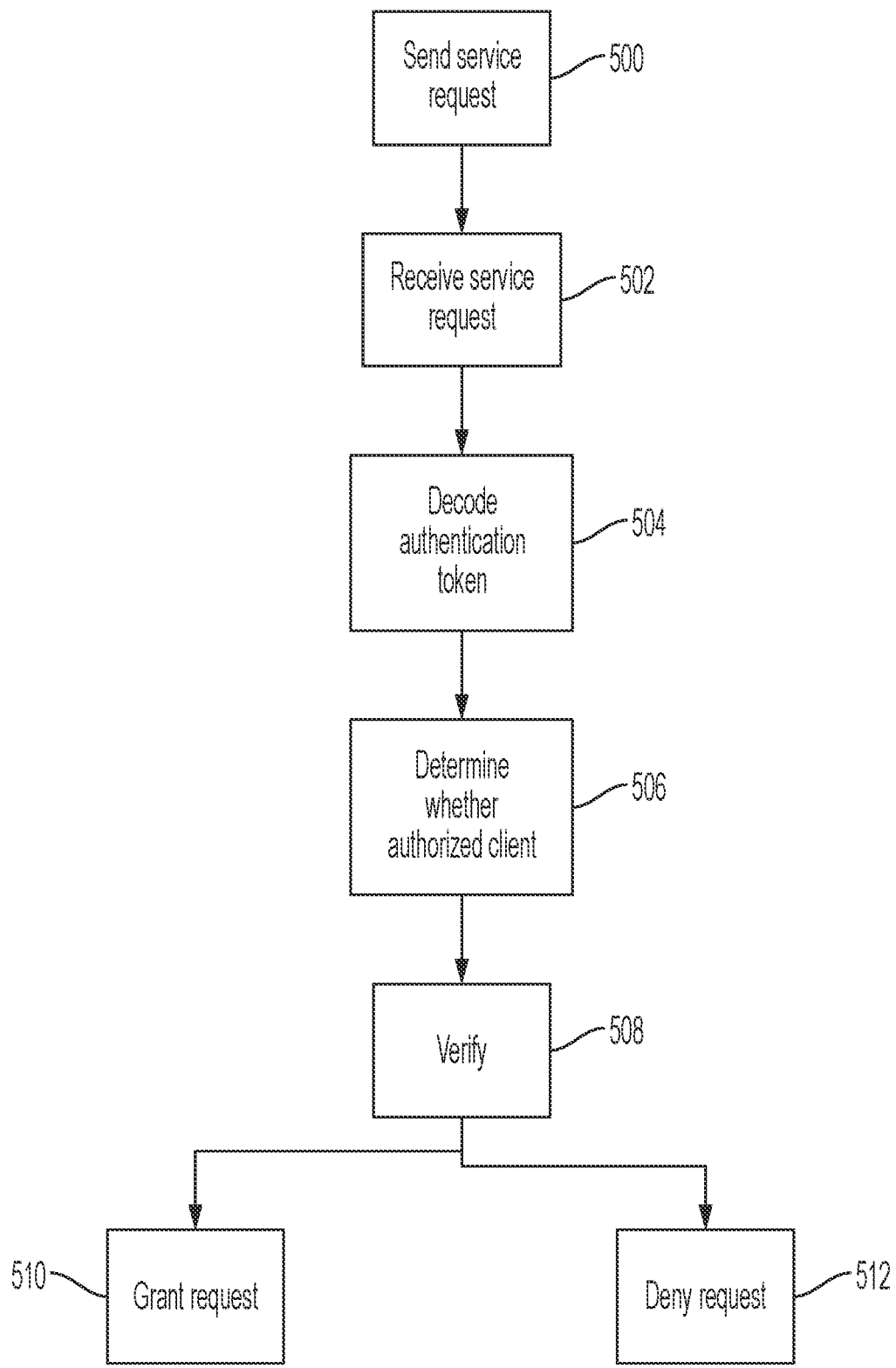
FIG. 5 illustrates an example method of processing a service request received from a client.

FIG. 5 illustrates an example method of processing a service request received from a client according to an embodiment. As illustrated in FIG. 5, a client may send 500 a service request to a data center. The service request may include the authentication token, or the client make send the authentication token in conjunction with the service request.

The data center may receive 502 the service request. The data center may decode 504 the authentication token to obtain the ACL that is included within the token. For example, the data center may use a public key to decode 504 the authentication token and obtain the ACL. The public key may be associated with the customer electronic device that encrypted the ACL. The public key and the private key may form a key pair associated with the customer electronic device. In various embodiments, a customer electronic device may provide the data center with its public key, which the data center may store in one or more data stores.

The data center may analyze the ACL to determine 506 whether the requesting client is an authorized client. For instance, a service request may include a unique identifier associated with the client making the service request. The data center may compare that unique identifier to one or more unique identifiers stored in the ACL. If there is a match, the data center may determine that the requesting client is an authorized client.

In an embodiment, the data center may verify 508 the access rights and/or permissions associated with the requesting client. For instance, a data center may identify one or more access rights or permissions associated with the requesting client from the ACL. If the access rights or permissions specified in the ACL correspond to the service request, the data center may grant 510 the service request and provide the requested service to the requesting client. Otherwise, the data center may deny 512 the service request and not provide the requested service to the requesting client.

In various embodiments, a customer electronic device may revoke one or more access rights of one or more of its clients. A customer electronic device may revoke only a portion of a client's access rights. Alternatively, a customer electronic device may revoke all of a client's access rights. A customer electronic device may send a message to one or more data centers that identifies a client and the access right(s) of the client that are being revoked. The data center(s) may receive this message and store this information in memory. When an access request is received by a data center from the client, the data center may determine whether access rights to the requested service by the client have been revoked. If the access rights being requested have been revoked, the data center may deny the service request. If the access rights being requested have not been revoked, the data center may grant the service request.

Figure 6:
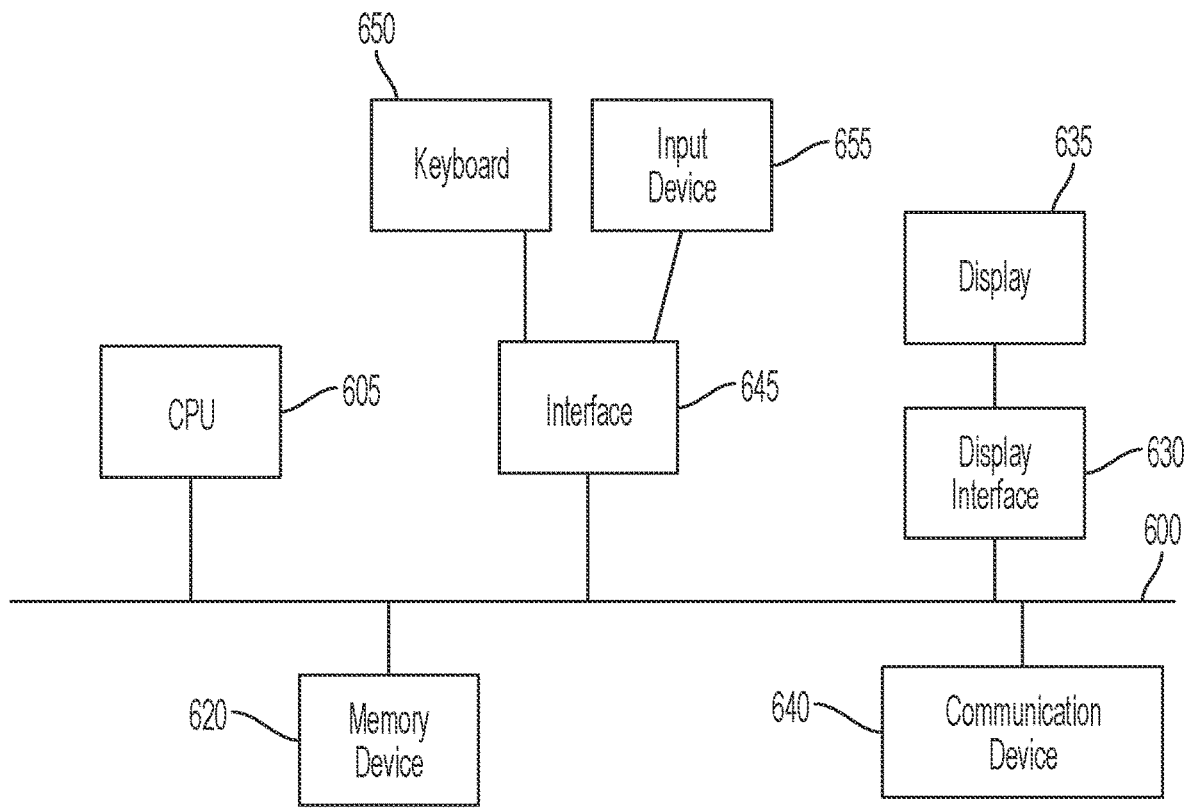
FIG. 6 depicts a block diagram of hardware that may be used to contain or implement program instructions.

FIG. 6 depicts a block diagram of hardware that may be used to contain or implement program instructions, such as those of a cloud-based server, electronic device, virtual machine, or container. A bus 600 serves as an information highway interconnecting the other illustrated components of the hardware. The bus may be a physical connection between elements of the system, or a wired or wireless communication system via which various elements of the system share data. Processor 605 is a processing device that performs calculations and logic operations required to execute a program. Processor 605, alone or in conjunction with one or more of the other elements disclosed in FIG. 6, is an example of a processing device, computing device or processor as such terms are used within this disclosure. The processing device may be a physical processing device, a virtual device contained within another processing device, or a container included within a processing device.

A memory device 620 is a hardware element or segment of a hardware element on which programming instructions, data, or both may be stored. Read only memory (ROM) and random access memory (RAM) constitute examples of memory devices, along with cloud storage services.

An optional display interface 630 may permit information to be displayed on the display 335 in audio, visual, graphic or alphanumeric format. Communication with external devices, such as a printing device, may occur using various communication devices 640, such as a communication port or antenna. A communication device 640 may be communicatively connected to a communication network, such as the Internet or an intranet.

The hardware may also include a user input interface 645 which allows for receipt of data from input devices such as a keyboard or keypad 650, or other input device 655 such as a mouse, a touch pad, a touch screen, a remote control, a pointing device, a video input device and/or a microphone. Data also may be received from an image capturing device 610 such as a digital camera or video camera. A positional sensor 615 and/or motion sensor 665 may be included to detect position and movement of the device. Examples of motion sensors 665 include gyroscopes or accelerometers. An example of a positional sensor 615 is a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of authorizing a client device to a service, the method comprising:
   by a processor that is a hardware component of an electronic device in response to a request from a customer:
      defining an access control list (ACL) that comprises a plurality of permissions for a plurality of authorized clients of the customer;
      creating a plurality of authorization tokens and encoding the ACL into each of the authorization tokens,
      distributing the authorization tokens to the authorized clients; and
   by a data center that provides a service to one or more of the authorized clients:
      receiving a service request to provide the service to a first client, wherein the service request comprises a submitted authorization token,
      decoding the submitted authorization token to identify a received ACL in the submitted authorization token,
      analyzing the received ACL to determine whether the first client is an authorized client and the permissions in the received ACL grant the first client permission to access the service, and
      in response to determining that the first client is an authorized client and the permissions in the received ACL grant the first client permission to access the service:
         accessing a memory of the data center to determine whether the memory stores information indicating that access rights of the first client have been revoked;

if the memory stores information indicating that access rights of the first client have been revoked, denying the first client permission to access the service, otherwise providing the service to the first client.

2. The method of claim 1, wherein:
the ACL also comprises a plurality of regular expression patterns; and
analyzing the received ACL to determine whether the first client is an authorized client comprises apply pattern matching to a regular expression pattern in the ACL and information received from the first client.

3. The method of claim 1, wherein encoding the ACL into each of the authorization tokens comprises:
applying a cryptographic operation on the ACL to generate an encrypted ACL; and
incorporating the encrypted ACL into each of the authorization tokens.

4. The method of claim 3, wherein applying the cryptographic operation comprises applying a hash function to the ACL or encrypting the ACL using a private key associated with the customer.

5. The method of claim 1, wherein distributing the authorization tokens to the authorized clients comprises doing so without retaining a copy of the ACL.

6. The method of claim 1, wherein the plurality of permissions comprise one or more of the following:
data read access;
data write access; or
management administrative access.

7. The method of claim 1, further comprising, by the data center, before determining that the first client is an authorized client and the permissions in the received ACL grant the first client permission to access the service, receiving, from the electronic device, an indication of one or more permissions that have been revoked for the first client.

8. A system for authorizing a client device to a service, the system comprising:
a first electronic device;
a first computer-readable storage medium comprising one or more programming instructions that, when executed, cause the first electronic device to:
define an access control list that comprises a plurality of permissions for a plurality of authorized clients of the customer,
create a plurality of authorization tokens, and encode the ACL into each of the authorization tokens,
distribute the authorization tokens to the authorized clients;
a second electronic device associated with a data center that provides a service to one or more of the authorized clients; and
a second computer-readable storage medium comprising one or more programming instructions that, when executed, cause the second electronic device to, in response to receiving a service request to provide the service to a first client, wherein the service request comprises a submitted authorization token,
decode the submitted authorization token to identify a received ACL in the submitted authorization token,
analyze the received ACL to determine whether the first client is an authorized client and the permissions in the applicable ACL grant the first client permission to access the service, and
in response to determining that the first client is an authorized client and the permissions in the received ACL grant the first client permission to access the service:
access a memory of the data center to determine whether the memory stores information indicating that access rights of the first client have been revoked;
if the memory stores information indicating that access rights of the first client have been revoked, deny the first client permission to access the service, otherwise provide the service to the first client.

9. The system of claim 8, wherein:
the ACL also comprises a plurality of regular expression patterns; and
the instructions to analyze the received ACL to determine whether the first client is an authorized client comprise instructions to apply pattern matching to a regular expression pattern in the ACL and information received from the first client.

10. The system of claim 8, wherein the one or more programming instructions that, when executed, cause the first electronic device to encode the ACL into each of the authorization tokens comprise one or more programming instructions that, when executed, cause the first electronic device to:
apply a cryptographic operation on the ACL to generate an encrypted ACL; and
incorporate the encrypted ACL into each of the authorization tokens.

11. The system of claim 10, wherein the one or more programming instructions that, when executed, cause the first electronic device to apply the cryptographic operation comprise one or more programming instructions that, when executed, cause the first electronic device to apply a hash function to the ACL or encrypt the ACL using a private key associated with the customer.

12. The system of claim 8, wherein the one or more programming instructions that, when executed, cause the first electronic device to distribute the authorization tokens to the authorized clients comprise one or more programming instructions that, when executed, cause the first electronic device to do so without retaining a copy of the ACL.

13. The system of claim 8, wherein the plurality of permissions comprise one or more of the following:
data read access;
data write access; or
management administrative access.

14. A method of authorizing a client device to a service, the method comprising:
by a processor that is a hardware component of an electronic device associated with a customer:
defining an access control list (ACL) that comprises a plurality of permissions for a plurality of authorized clients of the customer;
creating a plurality of authorization tokens and encoding the ACL into each of the authorization tokens, wherein encoding the ACL into each of the authorization tokens comprises:
applying a cryptographic operation on the ACL to generate an encrypted ACL, and
incorporating the encrypted ACL into each of the authorization tokens, distributing the authorization tokens to the authorized clients; and
by a data center that provides a service to one or more of the authorized clients:

receiving a service request to provide the service to a first client, wherein the service request comprises a submitted authorization token, decoding the submitted authorization token to identify a received ACL in the submitted authorization token, analyzing the received ACL to determine whether the first client is an authorized client and the permissions in the received ACL grant the first client permission to access the service, and in response to determining that the first client is an authorized client and the permissions in the received ACL grant the first client permission to access the service, providing the service to the first client.

15. The method of claim 14, wherein applying the cryptographic operation comprises applying a hash function to the ACL or using a private key associated with the customer.

16. The method of claim 14, wherein:

the ACL also comprises a plurality of regular expression patterns; and analyzing the received ACL to determine whether the first client is an authorized client comprises apply pattern matching to a regular expression pattern in the ACL and information received from the first client.

17. A system for authorizing a client device to a service, the system comprising:

a first electronic device;

a first computer-readable storage medium comprising one or more programming instructions that, when executed, cause the first electronic device to:

define an access control list that comprises a plurality of permissions for a plurality of authorized clients of the customer, create a plurality of authorization tokens, and encode the ACL into each of the authorization tokens, wherein the instructions to encode the ACL into each of the authorization tokens comprise instructions to:

apply a cryptographic operation on the ACL to generate an encrypted ACL, and incorporate the encrypted ACL into each of the authorization tokens, distribute the authorization tokens to the authorized clients;

a second electronic device associated with a data center that provides a service to one or more of the authorized clients; and a second computer-readable storage medium comprising one or more programming instructions that, when executed, cause the second electronic device to, in response to receiving a service request for the service from a requesting client, wherein the service request comprises a submitted authorization token:

decode the submitted authorization token to identify a received ACL in the submitted authorization token, analyze the received ACL to determine whether the first client is an authorized client and the permissions in the applicable ACL grant the first client permission to access the service, and in response to determining that the first client is an authorized client and the permissions in the received ACL grant the first client permission to access the service.

18. The system of claim 17, wherein:

the one or more programming instructions that, when executed, cause the first electronic device to apply the cryptographic operation comprise one or more programming instructions that, when executed, cause the first electronic device to:

apply a hash function to the ACL; or encrypt the ACL using a private key associated with the customer;

the ACL also comprises a plurality of regular expression patterns; and the instructions to analyze the received ACL to determine whether the first client is an authorized client comprise instructions to apply pattern matching to a regular expression pattern in the ACL and information received from the first client.

19. The system of claim 17, wherein the one or more programming instructions that, when executed, cause the first electronic device to distribute the authorization tokens to the authorized clients comprise one or more programming instructions that, when executed, cause the first electronic device to do so without retaining a copy of the ACL.

* * * * *